R. E. HAIRE.
WALL CONSTRUCTION AND PROCESS.
APPLICATION FILED MAR. 17, 1920.
1,355,667. Patented Oct. 12, 1920.
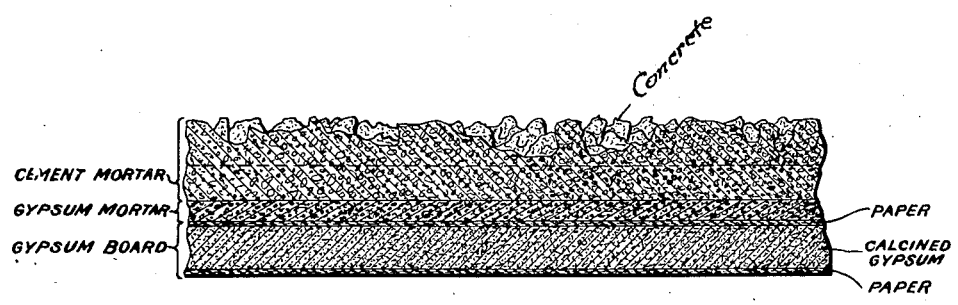
Inventor:
Robert E. Haire,
By Spear, Middleton, Donaldson & Hall
Attorneys.

UNITED STATES PATENT OFFICE.

ROBERT E. HAIRE, OF PARIS, ONTARIO, CANADA.

WALL CONSTRUCTION AND PROCESS.

1,355,667.     Specification of Letters Patent.     Patented Oct. 12, 1920.

Application filed March 17, 1920. Serial No. 366,609.

*To all whom it may concern:*

Be it known that I, ROBERT E. HAIRE, a citizen of Canada, and a resident of Paris, Ontario, Canada, have invented certain new and useful Improvements in Wall Construction and Processes, of which the following is a specification.

My invention relates to walls for buildings and the process of making the same, and it concerns particularly that form of wall in which gypsum board or gypsum blocks are employed, the invention being intended particularly for exterior walls. Portland cement as is well known is employed as a weather resistant for the exterior of walls but it will not adhere to what is known as gypsum board or blocks and hence it is one object of the present invention to provide a bond coating between the gypsum board or blocks and the exterior coating of Portland cement so that the latter will remain as a permanent exterior coating.

The methods commonly used are as follows: It is very common practice for cheap buildings to plaster with ordinary mortar for the exterior about as is done for the interior. Where Portland cement has been used it has been found necessary to use lath for the cement to form a clench because the cement will not adhere directly to wood, or common building materials. Owing to high prices of lumber, however, the so-called "plaster-board" has come into use largely for both interior and exterior plastering. As Portland cement will not adhere to this, which is made by rolling calcined gypsum between two pieces of paper, etc., and as it likewise fails when attempt is made to apply it to so-called gypsum blocks when made with calcined gypsum and cast in block form—these being laid one upon the other to construct the wall, it has been the practice to cover the gypsum blocks with bitumen or tar paint and fasten wire netting to the blocks after the paint is applied to them to form a bond mechanically, between the cement and the structure. The blocks are sometimes placed apart for air space between the two walls made up say of a block of 3″ thick and one of 4″ with a space of 1″ between them and the workman has, under common practice, placed ties across this space in the form of strips of metal. The present method avoids the main difficulties found in the old methods, and a large amount of expense in material and labor is saved.

This consists in applying, as a bond, a coat of what is known as hardwall plaster, which is retarded calcined gypsum mixed with sand, the retarded calcined gypsum having been used generally in plastering since first discovered and patented in 1875 by M. B. Church, No. 161,591.

This plaster or bond coating is applied to any ordinary structure or to gypsum blocks or gypsum board described above with a trowel or by machine in what is called stucco finish. Then one or more coatings of Portland cement plaster is applied in the ordinary way to this hardwall plaster. The cement will adhere to the gypsum and sand coat, at any time, if the plaster is left rough, but for best work the cement should be applied when the plaster coat is still damp and preferably before it has finished setting or hardening. The cement mortar does not enter into the former coat as an intermixture but unites with it physically and chemically forming a complete union which is quite as firm at the joining point as either of the plaster coats are.

The ties mentioned above may be substituted by the workman with a dab of gypsum mortar occasionally, while he is laying up the blocks as this adheres to the gypsum blocks on both inner sides of the wall.

The final coat of Portland cement may be improved as to water resisting power by the addition of the ordinary waterproof mixture generally used.

A wall according to my invention is illustrated in the accompanying drawing which represents a transverse sectional view of the same.

One advantage of a wall built as described above with gypsum board or gypsum blocks and gypsum plaster, as a bonding coat and cement as an exterior weather resisting coat is the insulation afforded against the passage of heat or cold from either the interior or exterior of the building. With the gypsum board on both sides of the studding and with the coating of gypsum plaster on either side it is found that it requires much less fuel to heat the building than it does with ordinary structures.

I claim:

1. A wall composed of gypsum board or gypsum blocks, an exterior weather resistant coating of hydraulic or Portland cement and an intermediate coating of hardwall plaster acting as a bond between the gypsum board or block and the exterior cement finish.

2. A wall composed of gypsum board or gypsum blocks, an exterior weather resistant coating of hydraulic or Portland cement and an intermediate coating of hardwall plaster acting as a bond between the gypsum board or block and the exterior cement finish, said hardwall plaster consisting of retarded gypsum mixed with sand.

3. The herein described method of forming a wall consisting in applying Portland cement mortar over gypsum mortar before the latter has finished setting.

4. The herein described method of forming a weather resisting wall consisting in applying a coating of hardwall plaster to a gypsum wall and leaving the surface of said plaster rough and thereafter applying an exterior weather resistant coating of hydraulic or Portland cement to the said plaster.

5. The herein described method of forming a weather resisting wall consisting in applying a coating of hardwall plaster to a wall of gypsum board or blocks, then applying a weather resistant coating of hydraulic or Portland cement to the plaster before the latter sets.

6. A wall composed of a base, a coating of mortar applied thereto and consisting of a mixture of calcined gypsum and sand, and an exterior weather resistant coating of Portland cement.

In testimony whereof I affix my signature.

ROBERT E. HAIRE.

Witnesses:
V. V. SMITH,
T. B. RANKIN.